(12) United States Patent
Gimelfarb et al.

(10) Patent No.: US 8,128,897 B2
(45) Date of Patent: Mar. 6, 2012

(54) CONTINUOUS PROCESS FOR PURIFICATION OF BRINE

(75) Inventors: Roma Gimelfarb, Highland Park, IL (US); Kurt John Waatti, Crystal Lake, IL (US); Francis Joseph Lipiecki, Haddonfield, NJ (US); Stephen Gerard Maroldo, Ambler, PA (US); Kenneth Eugene Sloffer, Silver Springs, NY (US)

(73) Assignee: Morton Salt, Inc., Chicago, IL (US)

( * ) Notice: Subject to any disclaimer, the term of this patent is extended or adjusted under 35 U.S.C. 154(b) by 407 days.

(21) Appl. No.: 12/151,398

(22) Filed: May 6, 2008

(65) Prior Publication Data

US 2009/0280044 A1  Nov. 12, 2009

(51) Int. Cl.
*C02F 1/00* (2006.01)

(52) U.S. Cl. ........ 423/160; 423/164; 423/165; 210/738; 205/536

(58) Field of Classification Search .......... 423/158–161, 423/164, 165; 210/712, 723, 724, 738, 767, 210/787, 800–804; 205/536; 422/245.1, 422/251
See application file for complete search history.

(56) References Cited

U.S. PATENT DOCUMENTS

| 2,479,138 | A | * | 8/1949 | Scoles | 423/160 |
| 4,038,365 | A | | 7/1977 | Patil et al. | |
| 4,392,959 | A | * | 7/1983 | Coillet | 210/638 |
| 5,279,463 | A | | 1/1994 | Holl et al. | |
| 5,690,820 | A | * | 11/1997 | Becnel et al. | 210/170.01 |
| 7,098,360 | B2 | | 8/2006 | Holl et al. | |
| 2003/0152500 | A1 | | 8/2003 | Dalziel et al. | |

FOREIGN PATENT DOCUMENTS

SU  470299  *  8/1975

* cited by examiner

*Primary Examiner* — Steven Bos
(74) *Attorney, Agent, or Firm* — Oblon, Spivak, McClelland, Maier & Neustadt, L.L.P.

(57) ABSTRACT

A continuous process for purification of brine contaminated with alkaline earth metals. The process comprises combining the brine with an aqueous solution containing at least one of an alkali metal hydroxide and an alkali metal carbonate with efficient mixing by a micro-mixing device.

16 Claims, No Drawings

CONTINUOUS PROCESS FOR PURIFICATION OF BRINE

BACKGROUND

This invention relates generally to a continuous process for purification of brine contaminated with alkaline earth metals.

Purification of brine by addition of sodium carbonate and/or sodium hydroxide to precipitate and remove alkaline earth metals is known, and is described, e.g. in U.S. Pat. No. 4,038,365. However, this method does not provide sufficiently low residual levels of alkaline earth metals to allow the brine to be used where high purity is required. In addition, batch processes require long cycle times.

The problem addressed by this invention is to find an efficient process for purification of brine to remove alkaline earth metals.

STATEMENT OF INVENTION

The present invention is directed to a process for purification of brine contaminated with alkaline earth metals; said process comprising: (a) mixing said brine and an aqueous solution comprising at least one of an alkali metal hydroxide and an alkali metal carbonate in a mixer having a gap no larger than 1 mm to produce purified brine and a precipitate; and (b) separating the purified brine and the precipitate.

DETAILED DESCRIPTION

All percentages are weight percentages ("wt %"), and temperatures are in ° C., unless specified otherwise. Concentrations in mg/L (ppm) are on the basis of weight/volume.

The combined solutions flow through a gap having a diameter no larger than 1 mm. The gap is formed by two surfaces in a mixer. In some embodiments of the invention, either or both of the two surfaces may be in motion. When one of the surfaces is discontinuous, e.g., when the gap is between a stationary surface and a rotor having blades or a cylindrical shape with openings, the gap will not be present continuously in the same position, but will move with the surface in motion. When one or both surfaces is in motion, the gap is the space between the moving surface and a stationary surface, or between the two moving surfaces. In some embodiments of the invention, the gap is less than 900 microns, alternatively less than 800 microns, alternatively less than 700 microns, alternatively less than 600 microns, alternatively less than 500 microns. In some embodiments of the invention, the gap is at least 100 microns, alternatively at least 250 microns, alternatively at least 350 microns. In some embodiments of the invention, the rotor has at least four blades.

In some embodiments of the invention, the gap is present in a micro-mixing apparatus. Among the mixing devices that may be utilized are inline high-intensity mixers, Ystral dynamic mixers, turbine rotor mixers, and micromixers. These devices include motionless mixers, dynamic mixers, centrifugal pumps, ejectors, and rotor/stator mixers. Rotor/stator mixers are especially preferred. In some rotor/stator mixers, e.g., the STT™ reactor, the reaction occurs in the annular space around a rotating shaft (cylinder) contained in a stator. This device is described, e.g., in U.S. Pat. No. 7,098,360. In other rotor-stator mixers, rotating blades force the liquid through a screen, wherein the small gap is between the ends of the blades and the screen. Such devices are described, e.g., in U.S. Pub. No. 2003/0152500. In devices having a rotor, preferably the rotation speed is from 500 rpm to 7500 rpm, alternatively from 750 rpm to 6000 rpm, alternatively from 1000 rpm to 5500 rpm, alternatively from 1000 rpm to 4000 rpm. An alternative measure of rotation is the linear speed between the moving surface and the stationary surface (or between two moving surfaces). In some embodiments of the invention, the linear speed is from 0.2 m/s and 50 m/s. In some embodiments of the invention, the mixer is subjected to ultrasonic vibration to improve mixing further.

In some embodiments of the invention, the temperature of the mixture in the mixer is from 10° C. to 70° C. This temperature is approximately equal to that of the mixture exiting the mixer. In some embodiments of the invention, the temperature is at least 20° C., alternatively at least 25° C., alternatively at least 30° C., alternatively at least 35° C., alternatively at least 40° C., alternatively at least 45° C., alternatively at least 50° C. In some embodiments, the temperature is no greater than 65° C., alternatively no greater than 60° C., alternatively no greater than 55° C.

In some embodiments of the invention, the concentration and amount of the aqueous solution comprising at least one of an alkali metal hydroxide and an alkali metal carbonate are such that the total number of equivalents of hydroxide and carbonate salts in the aqueous solution is from 0.95 to 1.4 times the total number of equivalents of alkaline earth metal salts in the brine. In some embodiments, the ratio is at least 0.98, alternatively at least 1, alternatively at least 1.05, alternatively at least 1.1, alternatively at least 1.12. In some embodiments, the ratio is no more than 1.3, alternatively no more than 1.25, alternatively no more than 1.2, alternatively no more than 1.15, alternatively no more than 1.12. In some embodiments of the invention, the concentration and amount of the aqueous solution comprising at least one of an alkali metal hydroxide and an alkali metal carbonate are such that the total number of equivalents of carbonate salts in the aqueous solution is from 0.95 to 1.3 times the total number of equivalents of alkaline earth metal salts in the brine; alternatively at least 0.98, alternatively at least 1, alternatively at least 1.02, alternatively at least 1.04; alternatively no more than 1.2, alternatively no more than 1.15, alternatively no more than 1.12, alternatively no more than 1.09. In some embodiments of the invention, the solution contains only an alkali metal carbonate. In some embodiments of the invention, the solution contains a metal carbonate, and sufficient metal hydroxide is added to raise the pH of the solution to at least 10, alternatively to at least 10.5; alternatively to no more than 12, alternatively to no more than 11.5. In some embodiments of the invention, the concentration and amount of the aqueous solution comprising at least one of an alkali metal hydroxide and an alkali metal carbonate are such that the total number of equivalents of hydroxide salts in the aqueous solution is from 0.95 to 2 times the total number of equivalents of alkaline earth metal salts in the brine; alternatively at least 0.98, alternatively at least 1, alternatively at least 1.05, alternatively at least 1.2, alternatively at least 1.4; alternatively no more than 1.8, alternatively no more than 1.6, alternatively no more than 1.5. Preferably, the alkali metal is sodium. In some embodiments of the invention, the metal carbonate concentration in the solution is from 10% to saturation, alternatively from 15% to saturation. In some embodiments of the invention, the metal hydroxide concentration is from 10% to saturation, alternatively from 20% to saturation, alternatively from 30% to saturation.

The flow rates of the brine and the solution comprising metal carbonate and/or metal hydroxide are not critical to the invention, except to the extent that they contribute to determining the stoichiometry of the reaction. One skilled in the art will be able to determine appropriate flow rates for a given mixer and given stoichiometry.

The brine treated in the method of this invention comprises sodium chloride and water. In some embodiments of the invention, the brine is saturated with sodium chloride. In some embodiments of the invention, the brine has a sodium chloride concentration of at least 10%, alternatively at least 15%, alternatively at least 20%, alternatively at least 25%. Typically, the most prevalent alkaline earth metals are calcium and magnesium. In some embodiments of the invention, the calcium concentration in the contaminated brine is from 1200 to 2200 mg/L, alternatively from 1400 to 2000 mg/L; and the magnesium concentration is from 80 to 450 mg/L, alternatively from 100 to 400 mg/L.

After the aqueous solution comprising at least one of an alkali metal hydroxide and an alkali metal carbonate is mixed with the brine, the precipitate of alkaline earth metal carbonates and/or hydroxides which forms is separated from the purified brine. This separation can be accomplished by filtration, settling or centrifugation. Settling is the preferred method. In some embodiments of the invention, the mixture exiting the mixer is agitated for a period of time up to 8 hours before separation to ensure complete precipitation of alkaline earth metal salts; alternatively up to 4 hours, alternatively up to 2 hours. In some embodiments of the invention, the mixture is allowed to settle for at least 0.5 hours, alternatively at least 1 hour, alternatively at least 2 hours, alternatively at least 4 hours; the mixture is allowed to settle no more than 36 hours, alternatively no more than 24 hours, alternatively no more than 18 hours, alternatively no more than 12 hours. Typically, the brine is allowed to cool to ambient temperature during settling.

In some embodiments of the invention, the brine purification process is part of a brine recycle loop in a chlor-alkali or electrolysis process. Reduction of alkaline earth metals introduced into the brine recycle loop, e.g., from addition of water or salt, will reduce scale formation and other undesirable effects due to alkaline earth metals.

Examples

A DOE was conducted using two levels of stoichiometry for the removal of $Ca^{+2}$ and $Mg^{+2}$ ions. Experiments were performed with continuous flow in a STT™ reactor having a mixer gap of 250 to 380 microns. The brine was saturated with respect to sodium chloride, and contained 1.58 g/L of calcium and 0.122 g/L of magnesium. The concentrations of carbonate and hydroxide in the solution added to the brine were 17% and 50%, respectively. After mixing, the treated brine was allowed to stand without further mixing, and to cool to ambient temperature. The results of these experiments were compared with results obtained using standard batch procedures.

| Level | $Na_2CO_3$ | NaOH |
|---|---|---|
| High (+) | 1.02 equivalents | 0.213 mL/min (163% stoichiometric) |
| Low (−) | 0.97 equivalents | 0.196 mL/min (151% stoichiometric) |

| DOE Matrix | | | Batch Results[1] (mg/L) | | STT Results (mg/L) | |
|---|---|---|---|---|---|---|
| | | Rota- | 2 hr/24 hr | | 2 hr/24 hr | |
| $Na_2CO_3$ | NaOH | tion[2] | $[Ca^{+2}]$ | $[Mg^{+2}]$ | $[Ca^{+2}]$ | $[Mg^{+2}]$ |
| − | − | − | | | 203/186[3] | 108/111[3] |
| − | − | + | 42.0/19.1 | 0.4/1.1 | 9.5/7.5 | 1.0/1.5 |
| − | + | − | 55.5/23.8 | 1.8/2.2 | 6.9/4.4 | 1.4/3.8 |
| − | + | + | | | 6.3/5.6 | 3.2/1.9 |
| + | − | − | 26.7/11.3 | 1.3/1.6 | 5.2/3.0 | 1.2/2.0 |
| + | − | + | | | 20.9/170[3] | 10.1/39[3] |
| + | + | − | 35.2/20.9 | 0.1/1.1 | 4.1/2.0 | 1.1/0.8 |
| + | + | + | | | 3.0/2.3 | 1.1/1.0 |

[1]Laboratory brine treatment used 100% and 105% stoichiometric soda ash (Ca) and 108% and 146% stoichiometric caustic (Mg).
[2]Rotation was used to control temperature. High rotation (3000 rpm) corresponds to a high temperature, and low rotation (1500 rpm) to a lower temperature.
[3]The results from this run suggest a problem with filtration of the treated brine for laboratory analysis.

These experiments show that the continuous process results in lower $[Ca^{+2}]$ by a factor of 4.4-8.6 after two hours and by 2.5 to 10.4 after 24 hrs. The results obtained for $[Mg^{+2}]$ appear to be independent of technique and show similar results for both processes.

A second set of experiments was carried out. These experiments were run under the conditions given in the table below and compared to the batch experiments as indicated in the table.

| DOE Matrix | | $[Ca^{+2}]$ (mg/L) | | $[Mg^{+2}]$ (mg/L) | |
|---|---|---|---|---|---|
| Stoichiometry (%) | | STT 2 hr./ | Batch 2 hr./ | STT 2 hr./ | Batch 2 hr./ |
| $Na_2CO_3$ | NaOH | 24 hr. | 24 hr. | 24 hr. | 24 hr. |
| 100 | 120 | 9.0/9.0 | 51/33 | 8.9/9.8 | 3.5/8.9 |
| 105 | 120 | 3.3/3.0 | 31/26 | 4.8/4.8 | 8.9/5.3 |

These results show that for calcium reduction, the STT™ reactor produces a final result in less time than a batch system and that the final result is lower than the batch result by a factor of 4-8. The results for the reduction of magnesium appear to be relatively independent of technique under the stoichiometries studied.

Results Obtained with the 275LS SILVERSON High-Shear Mixer

A third set of experiments were carried out using a representative rotor stator mixer, run at 3600 rpm, with a square-hole high-shear screen. The results are presented in the following table (run 1). These results show that brine can be softened in a continuous process using high shear mixing to reduce the residual levels of calcium and magnesium and provide sufficient settling time to allow a continuous brine softening process. The process also allows for the option of heating the brine, which further reduces residual calcium levels as shown in additional experiments (runs 2-6). Reactant flow rates, treated brine pH, average brine temperature exiting the mixer, and their effect on final Ca, Mg concentration of output stream are tabulated below.

| Treated Sample # | Temp. Actual °F. (°C.) | Actual Caustic LPH[1] | Actual Soda Ash LPH | pH Initial | Residual [$Ca^{+2}$] avg mg/L | Residual [$Mg^{+2}$] avg mg/L |
|---|---|---|---|---|---|---|
| 1 | 79 (26)[2] | 8 | 76 | 10.8 | 11.4 | 4.7 |
| 2 | 98 (37) | 8 | 76 | 10.8 | 6.0 | 3.6 |
| 3 | 110 (43) | 8 | 75 | 10.6 | 4.2 | 4.6 |
| 4 | 121 (49) | 9 | 74 | 10.8 | 2.9 | 4.2 |
| 5 | 133 (56) | 9 | 76 | 10.8 | 2.2 | 4.9 |
| 6 | 142 (60) | 9 | 75 | 10.6 | 2.5 | 5.2 |
| 7[3] | 71 (22) | 7 | 81 | 10.9 | 34.1 | 11.4 |
| 8[3] | 120 (49) | 10 | 82 | 10.8 | 1.1 | 9.8 |
| 9[4] | 119 (49) | 10 | 79 | 10.8 | 0.8 | 5.8 |
| 10[3] | 119 (49) | 6 | 82 | 10.2 | 1.4 | 18.8 |
| 11[4] | 118 (49) | 5.4 | 79 | 10.2 | 2.6 | 19.0 |

[1] Liters per hour
[2] Average unheated brine temperature
[3] 105% stoichiometry with respect to carbonate
[4] 102% stoichiometry with respect to carbonate
Flow rate of brine was fixed at 25 gpm (95 L/hr) for all the runs

The invention claimed is:

1. A process for purification of brine contaminated with alkaline earth metals, comprising:
    (a) mixing the contaminated brine with an aqueous solution comprising at least one alkali metal hydroxide and at least one alkali metal carbonate to form a mixture having a pH of at least 10 in an inline high-intensity mixer having a gap of diameter no larger than 1 mm formed by two surfaces of the mixer;
    (b) continuously flowing the mixture through the gap to produce purified brine and a precipitate; and
    (c) separating the purified brine and the precipitate.

2. The process of claim 1, wherein the inline high-intensity mixer is a rotor-stator mixer.

3. The process of claim 1, wherein
    a total number of equivalents of hydroxide in the aqueous solution added to the contaminated brine is from 0.95 to 2 times a total number of equivalents of alkaline earth metal salts in the contaminated brine, and
    a total number of equivalents of carbonate is from 0.95 to 1.2 times a total number of equivalents of alkaline earth metal salts in the contaminated brine.

4. The process of claim 1, wherein a temperature of the brine mixture passed through the gap in the in-line mixer is from 35° C. to 65° C.

5. The process of claim 1, wherein the gap is at least 250 microns.

6. The process of claim 1, wherein the separation of the purified brine and the precipitate comprises settling.

7. The process of claim 6, further comprising:
    filtering the precipitate from the purified brine;
    wherein a time of the settling is from 0.5 to 48 hours prior to filtration.

8. The process of claim 3, wherein the total number of equivalents of hydroxide in the aqueous solution is from 1 to 1.8 and a total number of equivalents of carbonate is from 0.98 to 1.15.

9. The process of claim 2 wherein a rotation rate of a rotor in the rotor-stator mixer is from 750 rpm to 6000 rpm.

10. A chlor-alkali or electrolysis process, comprising:
    purifying the brine according to the process of claim 1 in a recycle loop.

11. The process of claim 1, wherein the separation comprises centrifugation.

12. The process of claim 1, wherein the alkali metal hydroxide is sodium hydroxide.

13. The process of claim 1, wherein the alkali metal carbonate is sodium carbonate.

14. The process of claim 2, wherein the rotor-stator mixer comprises an annular space around a rotating shaft in a stator.

15. The process of claim 14, wherein a linear speed between a moving surface and a stationary surface is from 0.2 to 50 m/s.

16. The process according to claim 1, further comprising:
    subjecting the mixer to ultrasonic vibration.

* * * * *

UNITED STATES PATENT AND TRADEMARK OFFICE
CERTIFICATE OF CORRECTION

PATENT NO. : 8,128,897 B2
APPLICATION NO. : 12/151398
DATED : March 6, 2012
INVENTOR(S) : Roma Gimelfarb et al.

Page 1 of 1

It is certified that error appears in the above-identified patent and that said Letters Patent is hereby corrected as shown below:

On the title page, Item (75), the fifth inventor's name is incorrect. Item (75) should read:

-- (75) Inventors: Roma Gimelfarb, Highland Park, IL (US); Kurt John Waatti, Crystal Lake, IL (US); Francis Joseph Lipiecki, Haddonfield, NJ (US); Stephen Gerard Maroldo, Ambler, PA (US); Kenneth Eugene Stoffer, Silver Springs, NY (US) --

Signed and Sealed this
First Day of May, 2012

David J. Kappos
*Director of the United States Patent and Trademark Office*